(12) United States Patent
Shariat et al.

(10) Patent No.: US 12,284,587 B2
(45) Date of Patent: Apr. 22, 2025

(54) DYNAMIC PATH SELECTION

(71) Applicant: Samsung Electronics Co., Ltd., Suwon-si (KR)

(72) Inventors: Mehrdad Shariat, Staines (GB); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 17/614,820

(22) PCT Filed: Dec. 15, 2020

(86) PCT No.: PCT/KR2020/018334
§ 371 (c)(1),
(2) Date: Nov. 29, 2021

(87) PCT Pub. No.: WO2021/141265
PCT Pub. Date: Jul. 15, 2021

(65) Prior Publication Data
US 2022/0232450 A1    Jul. 21, 2022

(30) Foreign Application Priority Data

Jan. 6, 2020 (GB) .................................. 2000125
May 1, 2020 (GB) .................................. 2006451
Dec. 7, 2020 (GB) .................................. 2019224

(51) Int. Cl.
*H04W 40/12* (2009.01)
*H04W 4/80* (2018.01)
(Continued)

(52) U.S. Cl.
CPC ............. *H04W 40/12* (2013.01); *H04W 4/80* (2018.02); *H04W 28/0268* (2013.01); *H04W 76/14* (2018.02); *H04W 76/23* (2018.02)

(58) Field of Classification Search
CPC ..... H04W 40/12; H04W 76/23; H04W 76/14; H04W 4/80; H04W 28/0268
See application file for complete search history.

(56) References Cited

U.S. PATENT DOCUMENTS 10,708,824 B2     7/2020  Lee et al.
2009/0168689 A1   7/2009  Itagaki et al.
(Continued)

FOREIGN PATENT DOCUMENTS

CN     110612742 A    12/2019
EP     2 076 092 A1    7/2009
(Continued)

OTHER PUBLICATIONS

Apple et al., KI#5: Evaluation and Conclusion—AF influenced direct communication path selection, S2-2009033, SA WG2 Meeting #142-E, Nov. 9, 2020, Elbonia, XP051953348.
(Continued)

*Primary Examiner* — Duc C Ho
(74) *Attorney, Agent, or Firm* — Jefferson IP Law, LLP (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of path selection in a system where a first User Equipment, UE, is operable to communicate with a second UE via either a first direct path or a second path via a telecommunication network and wherein the active path is selected to be the first path or second path in response to a trigger derived from: a) either one of the first (Continued)

and second UEs; b) the telecommunication network; or c) an application function in the network miming in coordination with one of the first or second UEs.

16 Claims, 8 Drawing Sheets

(51) Int. Cl.
*H04W 28/02* (2009.01)
*H04W 76/14* (2018.01)
*H04W 76/23* (2018.01)

(56) References Cited

U.S. PATENT DOCUMENTS

| | | |
|---|---|---|
| 2012/0287807 A1 | 11/2012 | Yamasaki et al. |
| 2018/0376308 A1 | 12/2018 | Xiao et al. |
| 2019/0356601 A1 | 11/2019 | Kweon et al. |
| 2019/0357082 A1 | 11/2019 | Kim et al. |
| 2020/0187298 A1 | 6/2020 | Chun |
| 2023/0345320 A1* | 10/2023 | Kuo .................... H04W 36/033 |

FOREIGN PATENT DOCUMENTS

| | | |
|---|---|---|
| EP | 3 432 655 A1 | 1/2019 |
| GB | 2588096 A | 4/2021 |
| KR | 10-2019-0132921 A | 11/2019 |
| WO | 2019-197426 A1 | 10/2019 |

OTHER PUBLICATIONS

Samsung, New Key Issue to support path switching between 5GC path and PC5 path, S2-1909605, 3GPP SA WG2 Meeting #135, Oct. 4, 2019, Split, Croatia, XP051795701.
Samsung et al., New Key Issue to support path selection and switching, S2-1910703, 3GPP SA WG2 Meeting #135, Oct. 18, 2019, Split, Croatia, XP051799725.
Oppo, NCIS use case—Proposal for Consolidated Requirements—Group, S1-191078, 3GPP TSG-SA WG1 Meeting #86, Apr. 29, 2019, Suzhou, P. R. China, XP051719024.
Oppo, Revision of NCIS Overview, S1-190250, 3GPP TSG-SA WG1 Meeting #85, Feb. 25, 2019, Tallinn, Estonia, XP051609511.
United Kingdom Search and Examination Report dated Apr. 22, 2022, issued in UKIPO Application No. GB2019224.1.
European Search Report dated Jun. 10, 2022, issued in European Application No. 20911649.0.
Huawei et al., Solution for the KI: Support direct communication path selection and switching between PC5 and Uu, S2-1911667, SA WG2 Meeting #136, Reno, USA, Nov. 8, 2019.
Samsung, Solution to support Direct Communication Path Selection, S2-1911344, 3GPP SA WG2 Meeting #136, Reno, USA, Nov. 8, 2019.
3rd Generation Partnership Project; Technical Specification Group Services and System Aspects; Study on Application Architecture to Support Mission Critical Push to Talk over LTE (MCPTT) Services (Release 13) 3GPP TR 23.779 V2.0.0, Sep. 2015.
Oppo, NCIS Use Case—Proposal for Consolidated Requirements—Group, S1-191501, 3GPP TSG-SA WG1 Meeting #86, May 6-10, 2019, Suzhou, P. R. China.
United Kingdom Search and Examination Report dated Apr. 28, 2021, issued in UKIPO Application No. GB2019224.1.
European Office Actions dated Apr. 17, 2024, issued in European Patent Application No. 20 911 649.0-1215.
Chinese Office Actions dated Jun. 26, 2024, issued in Chinese Patent Application No. 202080040960.4.

\* cited by examiner

DYNAMIC PATH SELECTION

TECHNICAL FIELD

The present invention relates to dynamic selection of preferred communication paths in a context of a mobile device or User Equipment (UE) operable with a telecommunication network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present invention is complementary to dynamic path switching schemes where a path (that has already been established) is switched from one mode of communication to another. Such a scheme is described in co-pending application GB1914327.0 filed in the name of the same applicant.

Proximity Services (ProSe) (specifically the direct communication) has been enhanced to support V2X services over LTE. For Fifth Generation Systems (5GS), the proximity services are expected to be an important system wide enabler to support various applications and services.

Another class of commercial services has recently emerged termed as Network-controlled Interactive services (NCIS) that share some commonality of requirements with public safety services and applications. NCIS refers to a kind of service which needs at least 2 UEs to join and share data, e.g. interactive gaming or data sharing. Those UEs in the same NCIS session are grouped together as one NCIS group, and the group is determined by application layer (i.e. NCIS application server).

Many interactive services occur in localised areas e.g. entertainment in a home party or a bar, or educational services in an office, or interactive gaming in an entertainments centre, or new generation of Augmented Reality/Virtual Reality (AR/VR) services improving the user experience at different venues like shopping malls, stadiums or other social events.

It is desirable that the 5G System be enhanced to support proximity-based services with one common architecture to take advantage of economies of scale, i.e. such architecture can be used for both public safety and commercial proximity services, where applicable.

For either form of service (Public Safety vs. commercial services), the requirements for throughput, latency, reliability and resource/power utilisation may be enhanced by employing dynamic path selection in addition to switching schemes where direct communication in the user plane (UP) with other users in Proximity (ProSe), termed as the ProSe Communication path, enables another degree of freedom to maintain service quality of experience, in addition to the conventional path through core network i.e. 5GC path between users.

DISCLOSURE OF INVENTION

Technical Problem

The present invention relates particularly to the selection between a first and second mode of communication between two UEs where one involves direct communication between the devices and the other involves the telecommunication network relaying all messages and signals.

Solution to Problem

According to the present invention there is provided an apparatus and method as set forth below. Other features of the invention will be apparent from the description which follows.

According to the present invention, there is provided a method of path selection in a system where a first User Equipment, UE, is operable to communicate with a second UE via either a first direct path or a second path via a telecommunication network and wherein the active path is selected to be the first path or second path in response to a trigger derived from:

a) either one of the first and second UEs;
    b) the telecommunication network; or
    c) an application function in the network running in coordination with one of the first or second UEs.

In a preferred embodiment, there is provided one or more of: enhanced signalling procedures, novel control notifications and triggers for path selection based on QoS targets fulfilments, congestion status or other changes observed by Radio-Access Network (Network-assisted) or Group topology formation or changes observed by Application Function (AF-assisted) over the location area where the path selection policy rules are applicable (either for public safety applications or for network-controlled interactive services)

In a preferred embodiment, a path selection policy may indicate different options as below or a combination of one or more of the following:

(a) only the ProSe path (via PC5) shall be used;
    (b) only the 5GC path (via Uu) shall be used;
    (c) ProSe path (via PC5) preferred, where the UE can choose between the PC5 path or Uu path.
    (d) 5GC path (via Uu) preferred, where the UE can choose between the PC5 path or Uu path.

The first two options, (a) and (b), indicate scenarios where based on an operator-level policy or service-level agreements only a single path can be used by the UE(s). On the other hand, Option (c) and Option (d) above show cases where the network (e.g. via policy control function) indicate a preferred path. However, based on QoS fulfilment, congestion indications or group topology formation/changes, as will be outlined below, the UE may choose the other path. The policy control regarding the network preferred path can be influenced via QoS/Congestion indications from RAN, via group topology changes or any other relevant network data analytics notification coming from NWDAF.

In an embodiment, the following steps are involved: a Policy Control Function, PCF, composes a policy indicating an action to be taken in the event of QoS fulfilment or congestion status, comparing the first and second paths; the PCF sends the policy, applicable to the first UE and to the RAN, to an Access and Mobility Management Function, AMF, and the AMF forwards this to the first UE and the RAN; and the RAN stores information in the policy in a UE context and uses it for determining notification triggers.

In an embodiment, the trigger is Application Function, AF, assisted, comprising the steps of: a server identifying the second UE, in a proximity range, during a direct group discovery by the first UE; a Network Exposure Function, NEF, or AF, storing information provided as a result of the direct group discovery in a Unified Data Repository, UDR; a Policy Control Function, PCF, receiving notification of a data change from the UDR; the PCF preparing a path selection policy for the first UE; the PCF sending the policy for the first UE to an Access and Mobility Management Function, AMF; the AMF forwarding the policy to the first UE; the first UE checking rules in the policy and selecting the first or the second path.

In an embodiment, wherein the trigger is Application Function, AF, assisted, comprising the steps of: a Policy Control Function, PCF, composing a policy for the first UE and composing a policy for a Radio Access Network, RAN, of the telecommunication network; the PCF sending both policies to an Access and Mobility Management Function, AMF, and the AMF forwarding a respective policy to the first UE and RAN, accordingly; the AF subscribing to a QoS Notification Control, QNC, status information from the PCF to receive notification on QoS fulfilment information for QoS flows related to a particular flow; the AF forwarding the QNC status information to the PCF so that the PCF can utilise the QNC status information in updating a rule in the policy for the first UE; the AF subscribing to a Network Data Analytics Function, NWDAF, to receive an analytics notification; the PCF triggering a UE Configuration Update Procedure for the first US, based on one or more of the notification on QoS fulfilment information and the analytics notification, to update the policy for the first UE; and the first UE checking rules in the policy and selecting the first or the second path.

In an embodiment, the AF combines multiple QNC notifications from multiple UEs within an area of interest or with similar AF identifier, before generating the QNC Status update to PCF.

In an embodiment, the AF forwards the analytics notification to the PCF and the PCF utilises the notification information to update UE policy rules for all related UEs.

In an embodiment, a path preference is influenced indirectly by PCF subscription to UDR.

In an embodiment, the first path is a ProSe path and the second path comprises a Uu connection in a 5GC network.

According to a second aspect of the present invention, an apparatus is provided comprising a telecommunication network, arranged to perform the method of the first aspect.

Although a few preferred embodiments of the present invention have been shown and described, it will be appreciated by those skilled in the art that various changes and modifications might be made without departing from the scope of the invention, as defined in the appended claims.

Advantageous Effects of Invention

According to the present invention, service requirements such as user data rate and latency requirements for different proximity applications can be guaranteed.

BRIEF DESCRIPTION OF DRAWINGS

For a better understanding of the invention, and to show how embodiments of the same may be carried into effect, reference will now be made, by way of example only, to the accompanying diagrammatic drawings in which.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), fifth generation (5G) NB (5gNB), or next generation NB (gNB).

The "UE" is an entity communicating with a BS and may be referred to as UE, device, mobile station (MS), mobile equipment (ME), or terminal.

Figure 1:
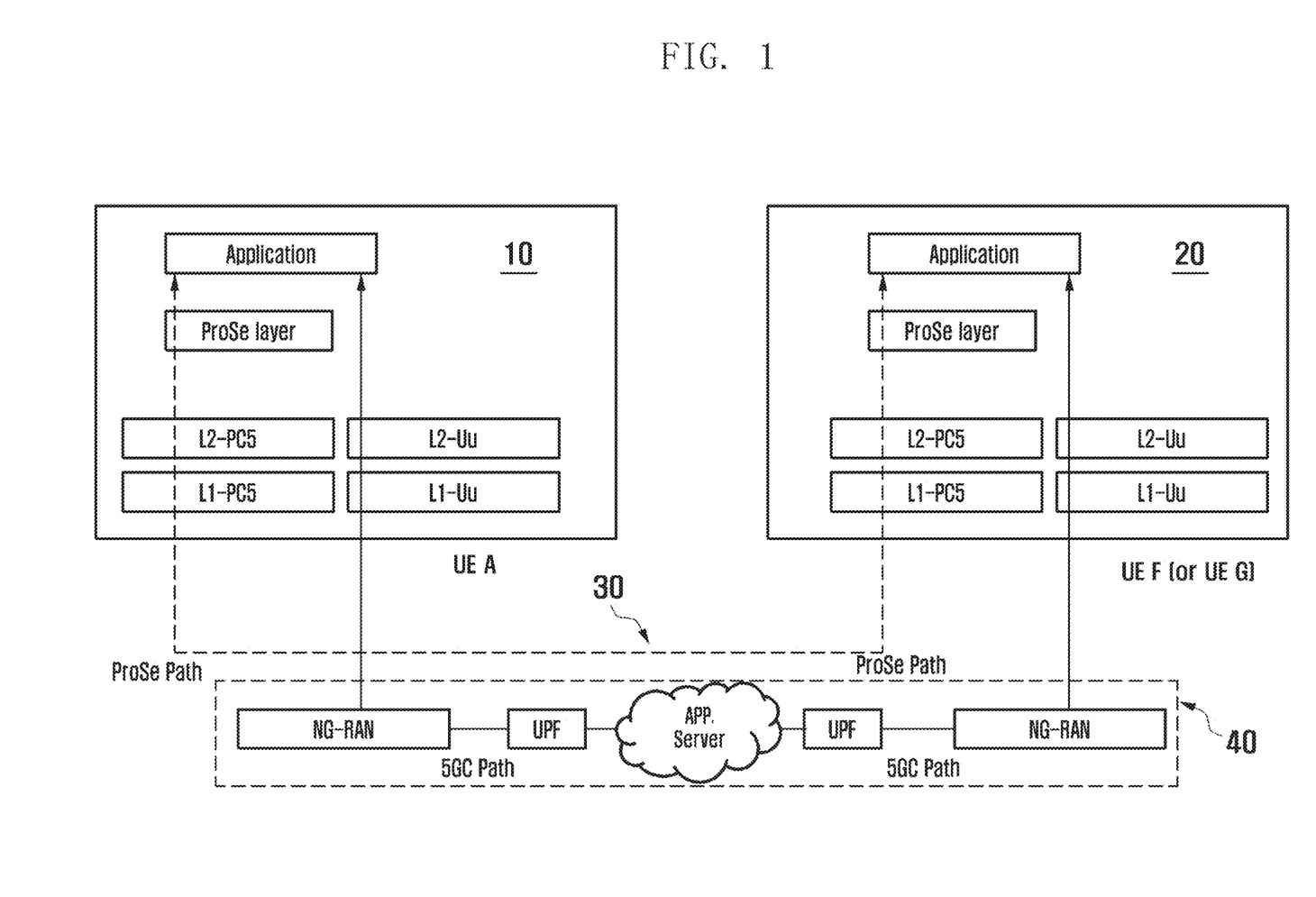
FIG. 1 shows an example of ProSe path vs. 5GC path between two UEs, according to an embodiment of the present invention.

In order to guarantee service requirements such as user data rate and latency requirements for different proximity applications, it is desirable that the 5G system is able to dynamically determine and select the appropriate UP path to exchange interactive service data either via the ProSe Communication path (direct) or via the 5GC path as shown in FIG. 1.

FIG. 1 shows a first UE 10 in communication with a second UE 20. The communication between the two UEs may be performed via a ProSe path 30 or via the 5G Core 40.

In the following embodiments of the invention, it is assumed that two example users, referred to as UE A (10) and UE F/G (20) want to establish a Public Safety/NCIS session together over a preferred path e.g. ProSe (PC5) path (30) but based on some triggering condition and control notifications to be described below, they decide to select e.g. 5GC (Uu) path (40) for their joint session.

Figure 2:
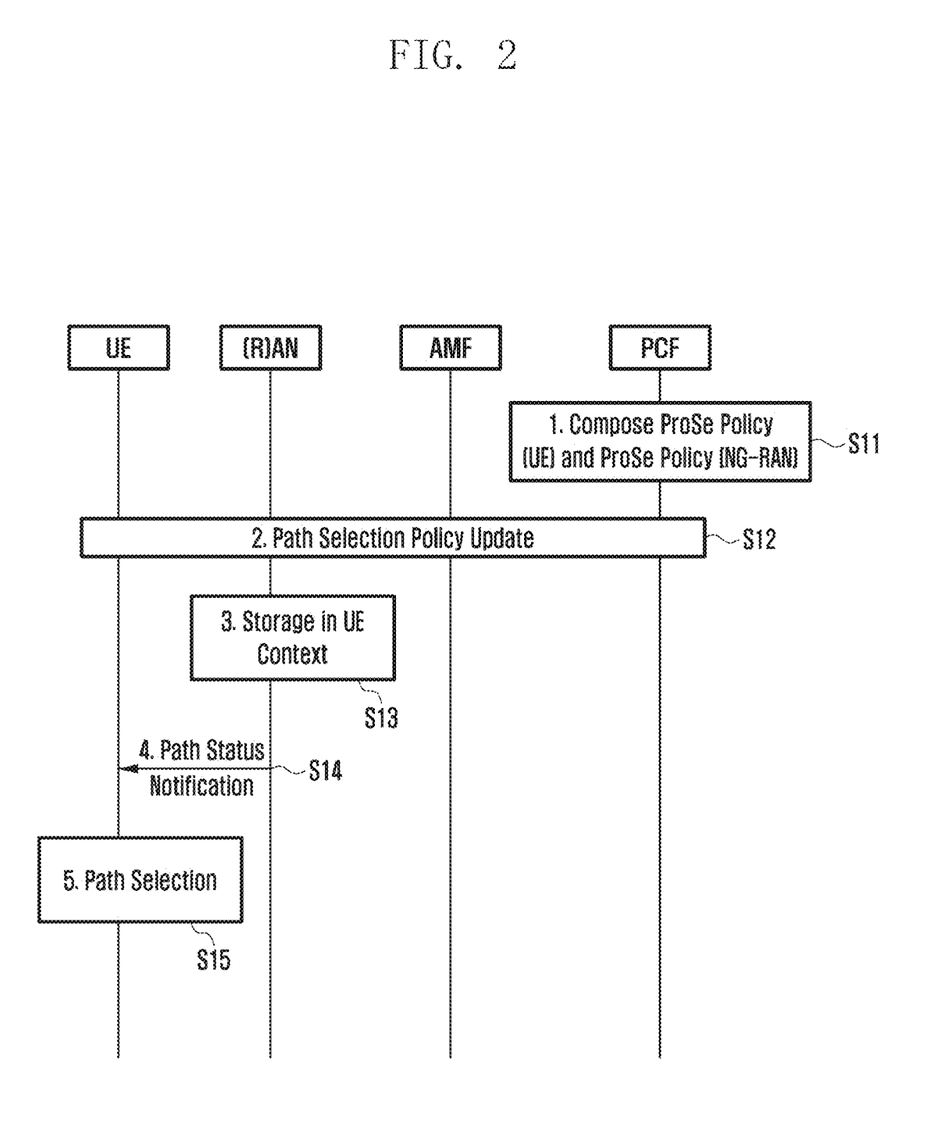
FIG. 2 shows a representation of a call flow according to an embodiment of the present invention.

FIG. 2, and the following figures, show various network functions/entities, whose functions and definitions are known in the art in at least: 3GPP TS 23.501, 3GPP TS 23.502 and 3GPP TS 23.503. The various known functions of these network functions/entities is varied/enhanced as set out in the following paragraphs.

For completeness, the various functions/entities shown are:
User Equipment: UE,
(Radio) Access Network: (R)AN,
Access and Mobility Management Function: AMF,
Policy Control Function: PCF,
Unified Data Repository: UDR,
Network Exposure Function: NEF,
Application Function: AF,
Network Data Analytics Function: NWDAF.

FIG. 2 shows a scenario according to an embodiment of the present invention. This scenario represents a path selection at the UE side, assisted by the network to choose between 5GC path and ProSe path.

In this scenario, it is assumed that RAN provides control notifications to UE based on QoS fulfilment or congestion status on PC5 (ProSe) path vs. Uu (5GC) path in order to establish/amend path selection policy.

Unless explicitly indicated, PCF refers to the policy control function utilised for UE policy and AM policy association. Otherwise, when stated (SM Policy) PCF refers to the policy control function utilised for SM policy association The service flow steps for the second scenario shown in FIG. 2 are as below.

Details of each step are:

S11. PCF composes ProSe policy for UE. PCF also composes ProSe policy for NG-RAN. The policy may include actions (to be taken) based on QoS fulfillment or congestion status over PC5 (ProSe) path vs. Uu (5GC) path. This is in particular applicable for network-scheduled mode of operation for ProSe services.

S12. PCF sends ProSe Policy for UE and ProSe Policy for NG-RAN to AMF. AMF transparently forwards this information to UE (as N1 message in N2 message) and NG-RAN (as N2 message) accordingly.

S13. NG-RAN stores this information as part of UE context and uses it for determining notification triggers. During a handover, source NG-RAN forwards this information to target NG-RAN. Alternatively, whenever NG-RAN changes, PCF provides ProSe Policy for target NG-RAN.

S14. NG-RAN detects congestion event (on PC5 or Uu path) or identifies that the QoS requirements cannot be met over one of the paths. NG-RAN notifies UE (over Radio Resource Control—RRC), e.g. to avoid using the congested path anymore, impacting path selection policy by UE due to the event detection.

S15. UE checks policy rules and selects the appropriate path.

Figure 3:
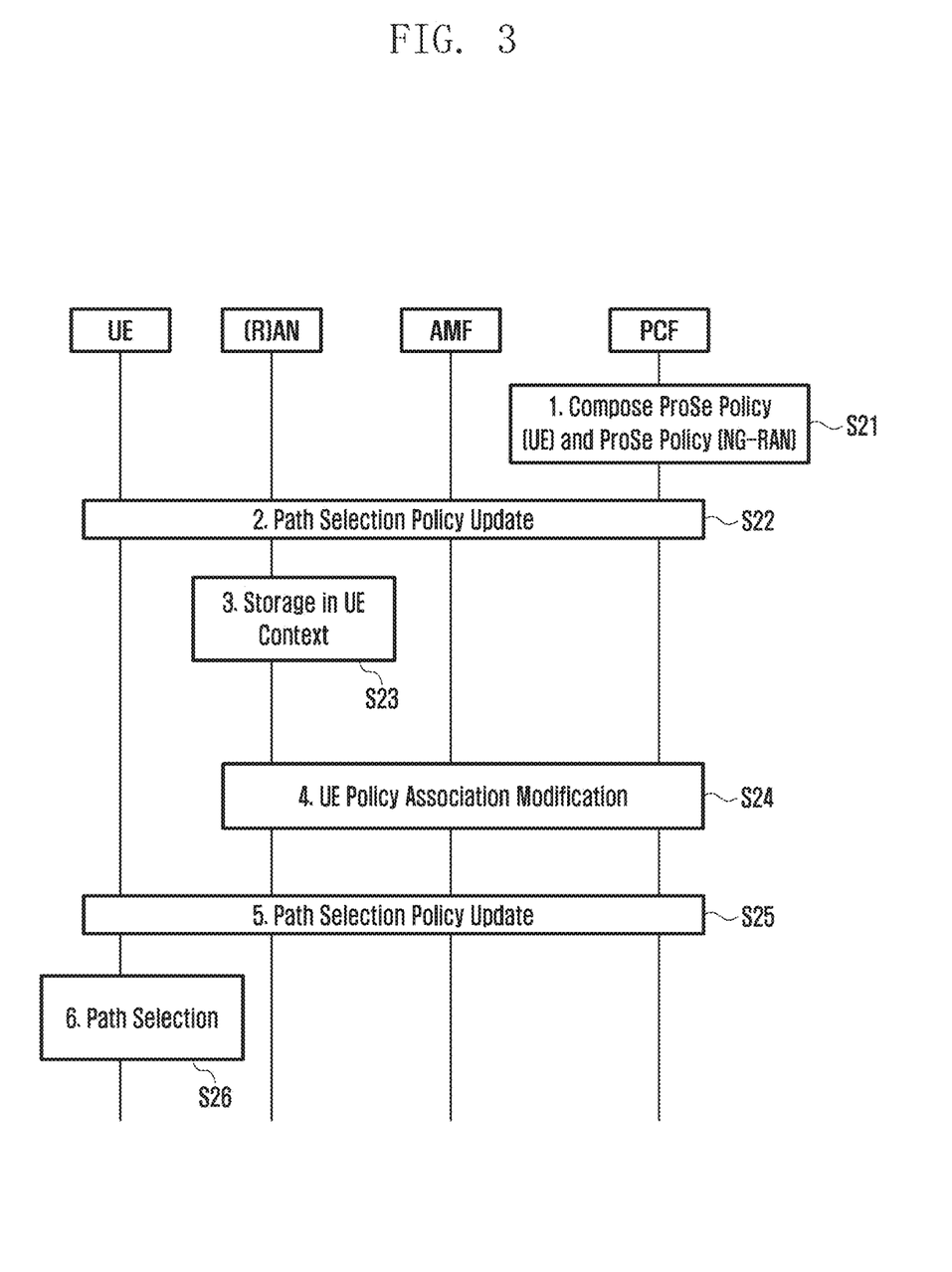
FIG. 3 shows a representation of a call flow according to an embodiment of the present invention.

FIG. 3 shows a second scenario according to an embodiment of the present invention. In this scenario, it is assumed that RAN provides control notifications to AMF to modify UE Policy Association (and accordingly path selection policy) based on QoS fulfilment or congestion status on PC5 (ProSe) path vs. Uu (5GC) path.

The service flow steps for the second scenario shown in FIG. 3 are as below. Steps S21-S23 are similar to steps S11-S13 in the first scenario shown in FIG. 2. Details of remaining steps are as below:

S24. NG-RAN detects path congestion event (either on PC5 or Uu) or identifies that the QoS requirements cannot be met over one of the paths. NG-RAN notifies AMF (based on ProSe Policy set by PCF for NG-RAN). Then, AMF sends a Npcf_UEPolicyControl Update Request to PCF. PCF sends a Npcf_UEPolicyControl Update Response to the AMF.

S25. PCF triggers UE Configuration Update Procedure (similar to Step S22) based on notification received in Step S24.

S26. UE checks policy rules and selects the appropriate path.

Figure 4:
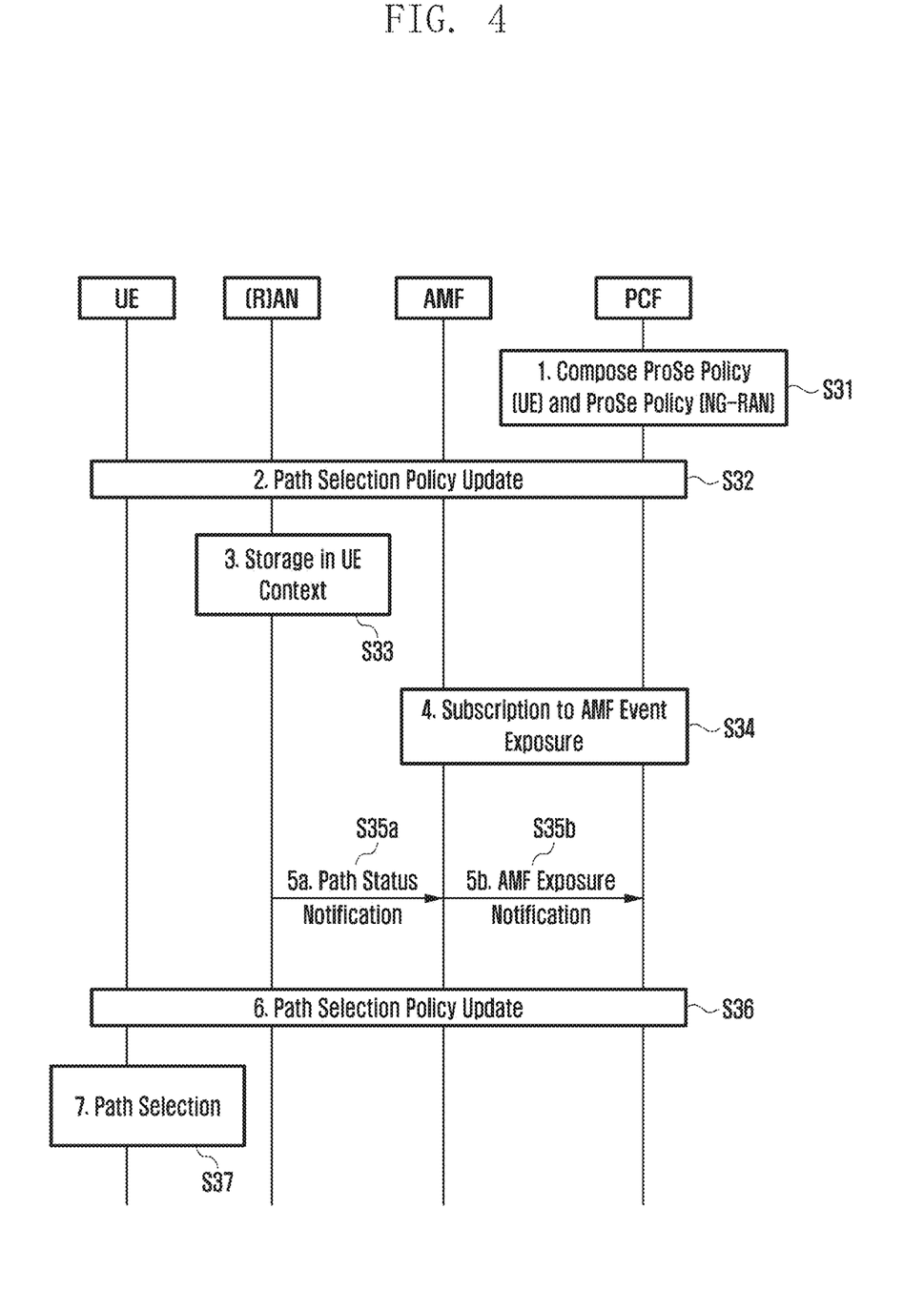
FIG. 4 shows a representation of a call flow according to an embodiment of the present invention.

FIG. 4 shows a third scenario according to an embodiment of the present invention. In this scenario, it is assumed that RAN provides control notifications to AMF based on a newly proposed AMF event that PCF subscribes to. This new event notifies QoS fulfilment or congestion status on PC5 (ProSe) path vs. Uu (5GC) path to PCF.

The service flow steps for the third scenario shown in FIG. 4 are as below. Steps S31-S33 are similar to steps S11-S13 and steps S21-S23 in the first and second scenarios shown in FIG. 2 and FIG. 3. Details of remaining steps are as below:

S34. PCF subscribes to AMF using Namf_EventExposure (for the newly proposed event on path status).

S35a and S35b. Then AMF sets notification control to NG-RAN about PC5 path vs. Uu path status. NG-RAN notifies the status to AMF (S35a), and then AMF sends Namf_EventExposure_Notify to PCF (S35b).

S36. PCF triggers UE Configuration Update Procedure (similar to Step S32) based on notification received in Step S35a and S35b.

S37. UE checks policy rules and selects the appropriate path.

Figure 5:
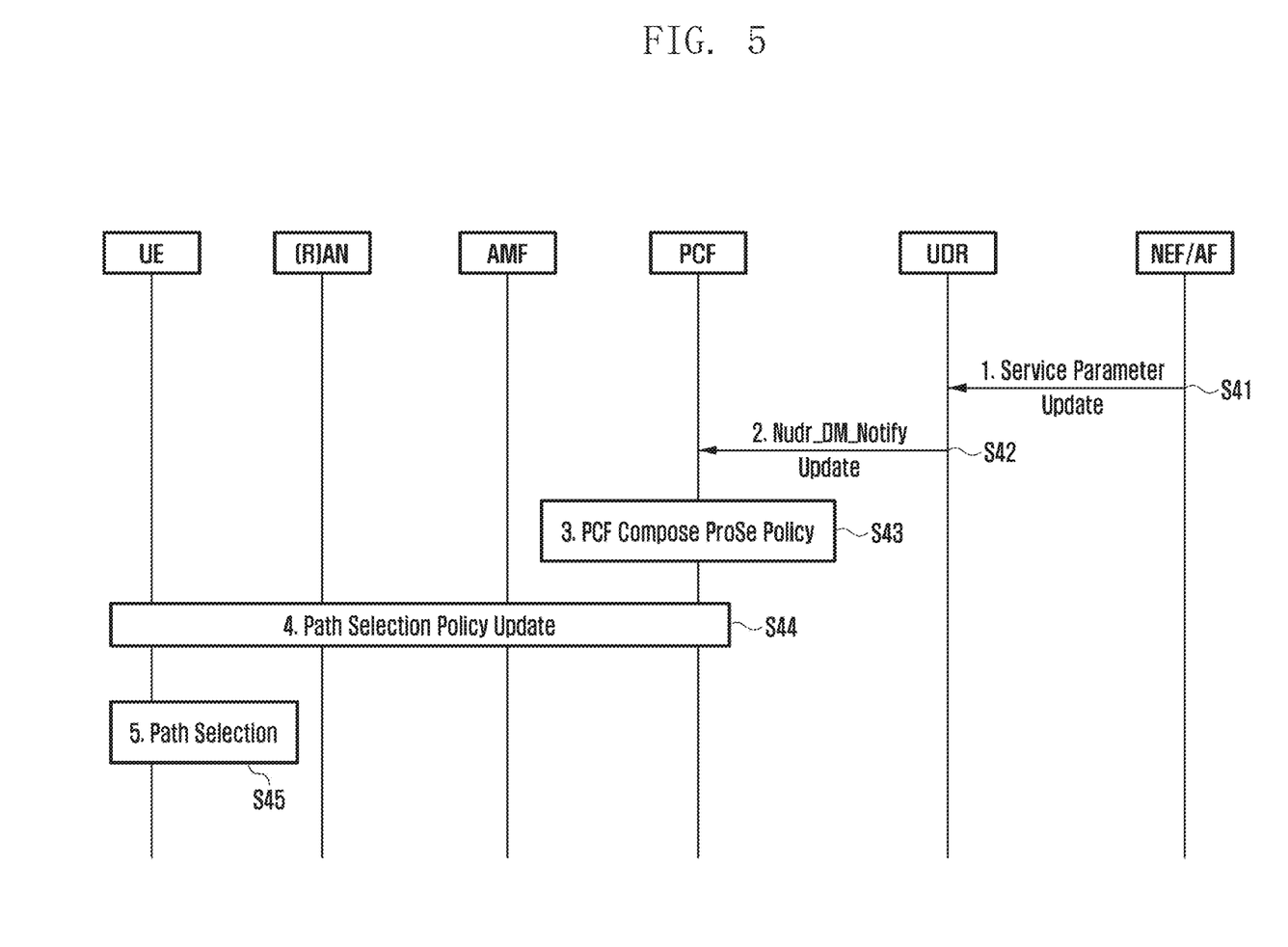
FIG. 5 shows a representation of a call flow according to an embodiment of the present invention.

FIG. 5 shows a fourth scenario according to an embodiment of the present invention. This scenario represents an application-assisted path selection between 5GC path and ProSe path.

In this scenario, it is assumed that the ProSe application server (at Application Function—AF level) based on the Network topology formation/arrangement observed decides to initiate a path selection (where the path selection policy rules are applicable). Furthermore, it is assumed that PCF (or any newly added NF taking its role) has already subscribed to UDR to receive notifications on any service parameter updates from application server.

The service flow steps for the third Scenario as shown in FIG. 5 are as below.

Details of each step are:

S41. The ProSe App. Server during a direct group discovery by UE A (over PC5-D) identifies UE F is in the proximity range for the current service. It is assumed that direct group discovery either runs periodically or may be triggered based on a proximity "notification alert" from PF (or any other new NF taking that role within 5GC) as already captured in TS 23.303. The NEF or AF stores the App. Server provided information within the UDR.

S42. The PCF receives the notification of data change from UDR (which it has already subscribed to).

S43. PCF composes the ProSe Policy for UE.

S44. PCF sends ProSe Policy for UE to AMF. AMF transparently forward this information to UE (as N1 message in N2 message).

S45. UE checks policy rules and selects the appropriate path.

Figure 6:
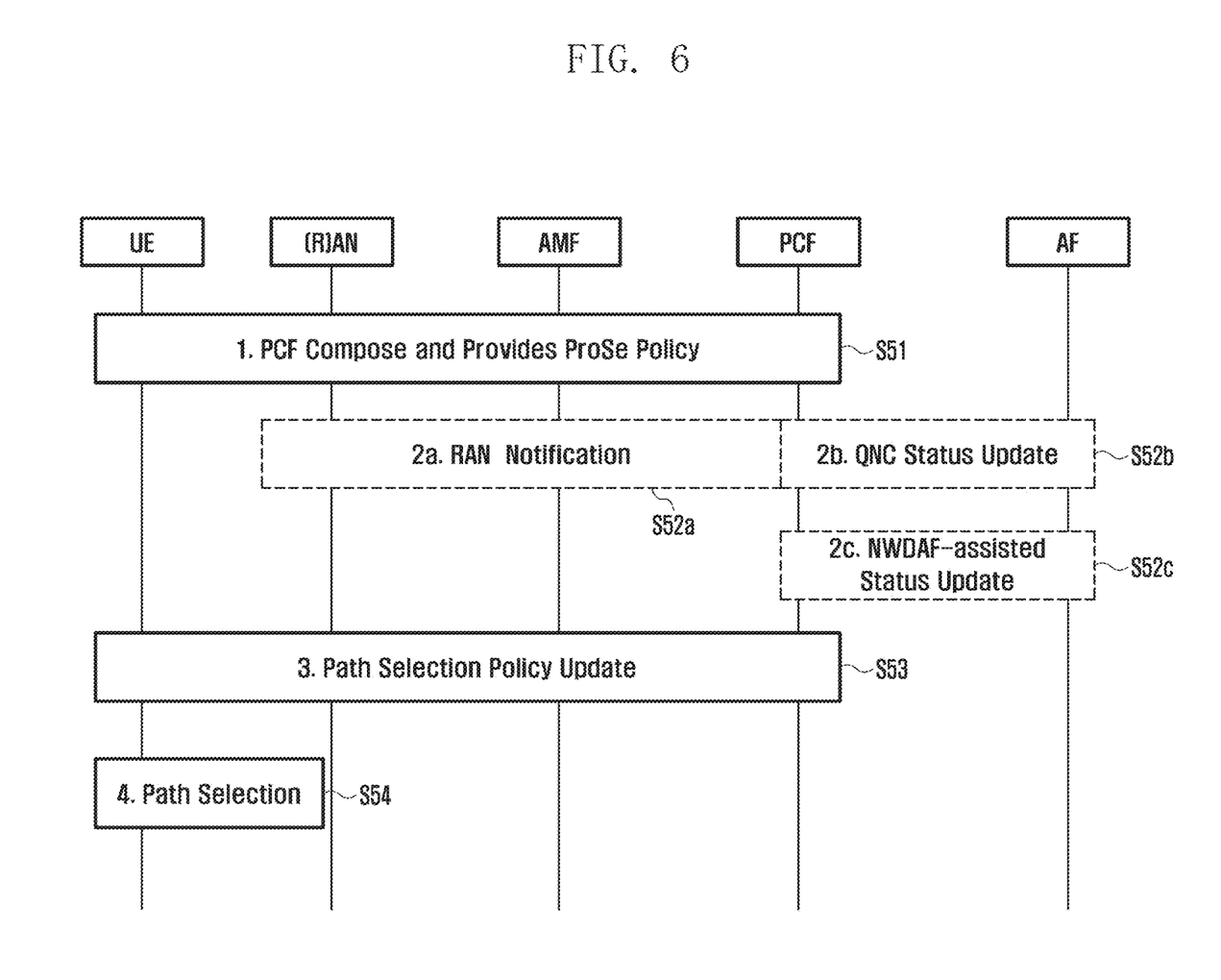
FIG. 6 shows a fifth scenario according to an embodiment of the present invention.

FIG. 6 shows a fifth scenario according to an embodiment of the present invention. This scenario represents an application function (AF)-assisted path selection between 5GC path and ProSe path where QoS Notification Control (QNC) status or any supporting analytics notification (either as statistics or prediction) from NWDAF is provided to PCF (e.g. via the ProSe AF).

The service flow steps for the fifth scenario as shown in FIG. 6 are as below.

S51. Triggered by ProSe AF, PCF composes ProSe policy for UE. PCF also composes ProSe policy for NG-RAN. The policy may include actions (to be taken) based on QoS fulfillment or congestion status over PC5 (ProSe) path vs. Uu (5GC) path (e.g. to leverage QNC from NG-RAN). This is in particular applicable for network-scheduled mode of operation for ProSe services. PCF sends ProSe Policy for UE and ProSe Policy for NG-RAN to AMF. AMF transparently forwards this information to UE (as N1 message in N2 message) and NG-RAN (as N2 message) accordingly.

S52(a). ProSe AF may subscribe to QNC from (SM Policy) PCF to receive notification on QoS fulfilment Status for QoS flows related to a particular ProSe AF-level flow. If NG RAN detects all QoS requirements cannot be fulfilled for one or more QoS Flows when requested by SMF for such notification, it may generate a notification. ProSe AF will also be notified based on the subscription to (SM Policy) PCF.

S52(b). ProSe AF can forward QNC Status update to PCF. PCF may utilise the notification information in updating the UE policy rules (incl. path selection policy/parameters) composed in Step S51 for all related UEs.

Note that ProSe AF may combine QNC notifications from multiple UEs (e.g. within an area of interest or with similar AF identifier) before generating a QNC Status update to PCF. Alternatively, NG-RAN can be instructed as part of ProSe Policy for NG-RAN to generate such combined RAN-level QNC notification rather that notifying QNC per UE.

Note that if (SM Policy) PCF and (UE Policy/AM Policy) PCF are co-located or the same, Step S52(a) and S52(b) can be altered and PCF may directly receive QNC notification relevant to SM Policy association control. PCF may combine QNC notifications for multiple UEs (e.g. in an area of interest or with similar AF identifier) before inferring how to update ProSe Policy per UE.

S52(c). Prose AF may subscribe to NWDAF to receive analytics notification (e.g.

relevant to QoS sustainability for all UEs in an area of Interest). ProSe AF can forward such analytics notification to PCF. PCF may utilise the notification information in updating the UE policy rules (incl. path selection policy/parameters) composed in Step 51 for all related UEs.

Note that step 52(c) can be altered when PCF may directly subscribe to receive analytics relevant to UE (Policy association control). PCF may combine multiple sets of analytics notifications (e.g. for different analytics types) before inferring how to update ProSe Policy per UE.

S53. PCF triggers UE Configuration Update Procedure (similar to Step S51) based on notification received in either step S52(b) or S52(c) or a combination of both to update path selection policy.

S54. UE checks policy rules and selects the appropriate path.

Note that a path preference can be influenced indirectly by PCF subscription to UDR based on e.g. Network topology formation/arrangement from AF (See FIG. 5) or NWDAF analytics notification forwarded via AF or QNC updates forwarded via AF (See FIG. 6).

By means of one of the aforementioned embodiments, it is possible to select (in either direction) a path from a choice between ProSe and 5GC paths. The embodiments described above set out possible triggers for such a selection and the steps which are required in order to activate the selection.

Figure 7:
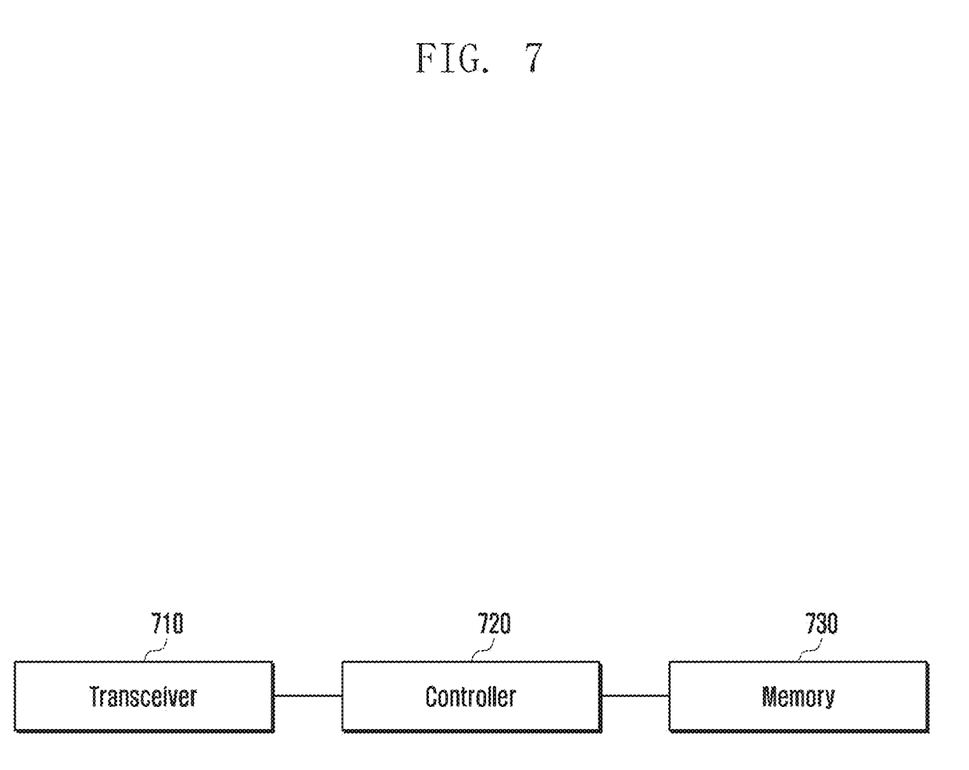
FIG. 7 shows a block diagram of an UE according to various embodiments of the present invention.

FIG. 7 is a block diagram illustrating a user equipment (UE) according to various embodiments.

As illustrated in FIG. 7, the UE 700 according to various embodiments may include a transceiver 710, a controller 720, and a memory 730. In the disclosure, the controller 720 may be defined as a circuit, an application-specific integrated circuit, or at least one processor.

The transceiver 710 according to various embodiments may transmit and receive signals, information, and data according to various embodiments to and from another network entity.

The controller 720 according to various embodiments may control the overall operation of the UE according to various embodiments provided by the disclosure.

The memory 730 according to various embodiments may store at least one piece of information transmitted and received through the transceiver 710 and information generated through the controller 720.

For example, the memory 730 may store data such as a basic program, an application, and configuration information for the operation of the UE according to various embodiments. Further, the memory may include at least one type of storage medium among a flash memory type, a hard-disk type, a multimedia card micro type, a card-type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). The processor may perform various operations using a variety of programs, content, and data stored in the memory.

Figure 8:
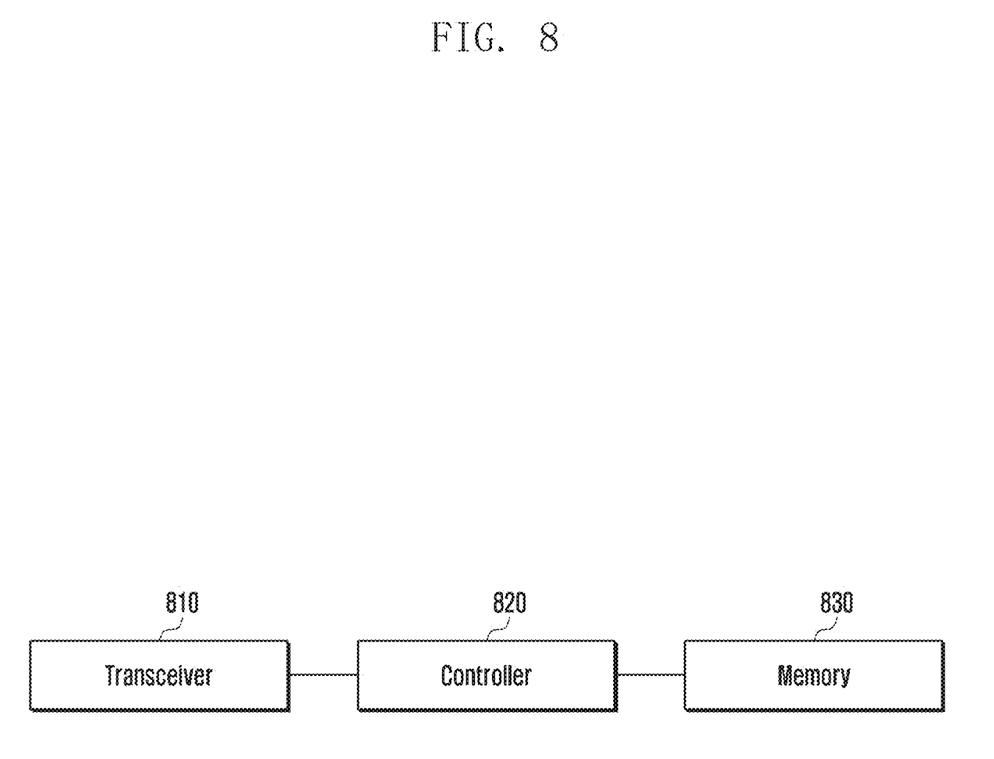
FIG. 8 shows a block diagram of a network entity according to various embodiments of the present invention.

FIG. 8 is a block diagram illustrating a network entity, such as a RAN, an AMF and a PCF entity, according to various embodiments.

As illustrated in FIG. 8, the network entity 800 according to various embodiments may include a transceiver 810, a controller 820, and a memory 830. In the disclosure, the controller 820 may be defined as a circuit, an application-specific integrated circuit, or at least one processor.

The transceiver 810 according to various embodiments may transmit and receive signals, information, and data according to various embodiments to and from another network entity. The transceiver 810 supports at least one of wired and wireless communications.

The controller 820 according to various embodiments may control the overall operation of the network entity according to various embodiments provided by the disclosure.

The memory 830 according to various embodiments may store at least one piece of information transmitted and received through the transceiver 810 and information generated through the controller 820.

For example, the memory 830 may store data such as a basic program, an application, and configuration information for the operation of the network entity according to various embodiments. Further, the memory may include at least one type of storage medium among a flash memory type, a hard-disk type, a multimedia card micro type, a card-type memory (for example, an SD memory, an XD memory or the like), a magnetic memory, a magnetic disk, an optical disk, a Random Access Memory (RAM), a Static RAM (SRAM), a Read-Only Memory (ROM), a Programmable Read-Only Memory (PROM), and an Electrically Erasable Programmable ROM (EEPROM). The processor may perform various operations using a variety of programs, content, and data stored in the memory.

Although presented in terms of ProSe and 5GC, the skilled person will readily appreciate that other network topologies and/or protocols which rely on direct communication between UEs and also network-assisted communication between the same devices will benefit from embodiments of the invention. As such, ProSe and 5GC are exemplary only and are not intended to be limiting examples.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method by a policy control function (PCF) entity for a proximity services (ProSe) in a wireless communication system, comprising:
   determining a path selection policy for a terminal indicating which path is preferred for a ProSe service in a direct communication, the preferred path for the ProSe service including a PC5 path or an Uu path; and
   transmitting, to the terminal via an access and mobility management function (AMF) entity, the path selection policy,
   wherein a path for the ProSe service is selected by the terminal based on the path selection policy before a connection with another terminal or a network is established.

2. The method of claim 1,
   wherein the PC5 path is selected by the terminal, in case that the path selection policy indicates the PC5 path for the ProSe service, and
   wherein the Uu path is selected by the terminal, in case that the path selection policy indicates the Uu path for the ProSe service.

3. The method of claim 1, further comprising:
   receiving, from a unified data repository (UDR) a notification of a data change,
   wherein the determination of the path selection policy is initiated based on the notification.

4. The method of claim 3,
   wherein the notification is generated based on information on a path preference for the ProSe service transmitted from an application function (AF) entity to the UDR, and
   wherein the path preference is determined based on quality of service (QOS) sustainability analytics provided from a network data analytics function (NWDAF) entity.

5. The method of claim 4,
   wherein a notification of a data change is transmitted from a unified data repository (UDR) to the PCF entity, and
   wherein the path selection policy is determined by the PCF entity based on the notification.

6. The method of claim 5,
   wherein the notification is generated based on information on a path preference for the ProSe service transmitted from an application function (AF) entity to the UDR, and
   wherein the path preference is determined based on quality of service (QOS) sustainability analytics provided from a network data analytics function (NWDAF) entity.

7. A method performed by a terminal for a proximity services (ProSe) in a wireless communication system, the method comprising:
   receiving, from a policy control function (PCF) entity via an access and mobility management function (AMF) entity, a path selection policy for the terminal indicating which path is preferred for a ProSe service in a direct communication, the preferred path for the ProSe service including a PC5 path or an Uu path-;
   selecting a path for the ProSe service based on the path selection policy; and
   establishing a connection with another terminal or a network based on the selected path.

8. The method of claim 7, wherein the selecting of the path for the ProSe service comprises:
   selecting the PC5 path, in case that the path selection policy indicates the PC5 path for the ProSe service; and
   selecting the Uu path, in case that the path selection policy indicates the Uu path for the ProSe service.

9. A policy control function (PCF) entity for a proximity services (ProSe) in a wireless communication system, the PCF entity comprising:
   a transceiver; and
   a controller configured to:
      determine a path selection policy for a terminal indicating which path is preferred for a ProSe service in a direct communication, the preferred path for the ProSe service including a PC5 path or an Uu path, and
      control the transceiver to transmit, to the terminal via an access and mobility management function (AMF) entity, the path selection policy,
   wherein a path for the ProSe service is selected by the terminal based on the path selection policy before a connection with another terminal or a network is established.

10. The PCF entity of claim 9,
    wherein the PC5 path is selected by the terminal, in case that the path selection policy indicates the PC5 path for the ProSe service, and wherein the Uu path is selected by the terminal, in case that the path selection policy indicates the Uu path for the ProSe service.

11. The PCF entity of claim 9, wherein the controller is further configured to:
control the transceiver to receive, from a unified data repository (UDR) a notification of a data change, and
determine the path selection policy based on the notification.

12. The PCF entity of claim 11,
wherein the notification is generated based on information on a path preference for the ProSe service transmitted from an application function (AF) entity to the UDR, and
wherein the path preference is determined based on quality of service (QOS) sustainability analytics provided from a network data analytics function (NWDAF) entity.

13. A terminal for a proximity services (ProSe) in a wireless communication system, the terminal comprising:
a transceiver; and
a controller configured to:
control the transceiver to receive, from a policy control function (PCF) entity via an access and mobility management function (AMF) entity, a path selection policy for the terminal indicating which path is preferred for a ProSe service in a direct communication, the preferred path for the ProSe service including a PC5 path or an Uu path,
select a path for the ProSe service based on the path selection policy, and
establish a connection with another terminal or a network based on the selected path.

14. The terminal of claim 13,
wherein a notification of a data change is transmitted from a unified data repository (UDR) to the PCF entity, and
wherein the path selection policy is determined by the PCF entity based on the notification.

15. The terminal of claim 14,
wherein the notification is generated based on information on a path preference for the ProSe service transmitted from an application function (AF) entity to the UDR, and
wherein the path preference is determined based on quality of service (QOS) sustainability analytics provided from a network data analytics function (NWDAF) entity.

16. The terminal of claim 13, wherein the controller is further configured to:
select the PC5 path, in case that the path selection policy indicates the PC5 path for the ProSe service, and
select the Uu path, in case that the path selection policy indicates the Uu path for the ProSe service.

* * * * *